3,634,316
SULFUR-VULCANIZABLE NATURAL AND SYN-
THETIC RUBBERY POLYMERS CONTAINING
XYLYLENE DIAMINES AS ANTIOZONANTS
Masatomo Ito, Yokohama-shi, Yasuo Miyazawa, Kawa-
saki-shi, and Tsuneo Gotoh, Yokohama-shi, Japan, as-
signors to Showa Denko Kabushiki Kaisha, Minato-ku,
Tokyo, Japan
No Drawing. Filed Aug. 18, 1969, Ser. No. 851,093
Claims priority, application Japan, Aug. 23, 1968,
43/59,925; Jan. 16, 1969, 44/2,622; Jan. 28,
1969, 44/5,728; July 9, 1969, 44/53,763
Int. Cl. C08d 11/04; C08f 51/58
U.S. Cl. 260—45.9                                    7 Claims

ABSTRACT OF THE DISCLOSURE

A composition comprising a rubber polymer and as an antiozonant a xylylenediamine derivative. This antiozonant has an excellent effect to prevent degradation of natural and synthetic rubbers by ozone, and is non-discoloring and non-staining.

---

This invention relates to antiozonants which have excellent effect to prevent degradation of natural and synthetic rubbers by ozone, and which are non-discoloring and non-staining.

Natural and synthetic rubbers are generally degraded under the influence of ozone, oxygen, heat of light, particularly ozone. Even the traces of ozone present in the air causes cracks on the surfaces of rubber articles exposed thereto for a prolonged period. Particularly when the rubber article is under stress, the degrading and cracking action of ozone is accelerated. The recent increase in discharge of exhaust gas from automobiles and rapid development in petrochemical industries are causing remarkable increase in ozone concentration in the air. Thus the problem of degradation of rubber articles by ozone is becoming even more serious.

Heretofore, various antiozonants for rubber have been proposed. The typical of such antiozonants include derivatives of urea or thiourea (U.S. Pat. Nos. 2,766,219; 2,781,330; 2,788,338 and British Pat. No. 887,174), derivatives of aliphatic amine (U.S. Pat. No. 3,436,368), and derivatives of aromatic amines. However, all of known antiozonants are subject to one defect or another, and require still further improvement. That is, generally speaking, derivatives of thiourea such as N,N'-dibutyl-thiourea, N,N'-dicyclohexylthiourea, or N,N'-dialkyl-alkanediamine, are non-discoloring and non-staining, but exhibit only insufficient antiozonant action. Whereas, derivatives of aromatic amines, for example, N-phenyl-N'-isopropyl-p-phenylenediamine and N,N'-di(2-naphthyl)-p-phenylenediamine, show a practical level of antiozonant activity, but they disagreeably discolor rubber articles with time passage when kept exposed to light. Some of those known antiozonants are themselves colored compounds, and therefore they can be used only with dark colored rubbers including those containing carbon black. Furthermore, discoloration of rubber caused by such known amine type antiozonants bloom over and migrate into the adjacent areas of the rubber article. For example taking a case of an automobile tire, the discoloration of the dark colored rubber layer containing such an antiozonant gradually migrates into the side wall layer of white rubber adhered to the former layer, to disagreeably discolor the surface appearance of said white rubber. This migratory property is normally referred to as "staining property" in the field.

It is now discovered according to the subject invention that N-substituted derivatives of xylylenediamine and xylylenediamines having one or two alkyl substituents on the ring provide excellent antiozonants for rubber. Any of the defined group of compounds very effectively prevent degradation of rubber caused by ozone. Furthermore, the compounds are themselves colorless or white, have no coloring action on rubber, show no discoloration under exposure to light, and have absolutely no staining property. Antiozonants of the invention are essentially different from heretofore known aliphatic or aromatic amine type antiozonants, in that the former are aralkylene diamine type, i.e., compounds in which the nitrogen atoms of two amino radicals are each linked with the benzene ring through a methylene radical. It is presumed that the two active methylene radicals linked with the two nitrogen atoms contribute to the above described excellent properties of the compounds as antiozonants.

More specifically, the antiozonants of the invention are compounds expressed by the general Formula I below:

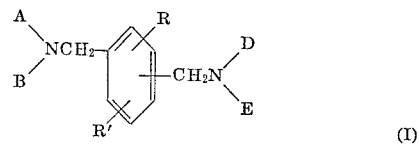

(I)

in which R and R' are each selected from the group consisting of a hydrogen atom and alkyl radicals of 1–4 carbons, and A, B, D and E are each selected from the group consisting of a hydrogen atom; alkyl, cycloalkyl, aryl and aralkyl radicals of up to 20 carbons; radicals of the formula

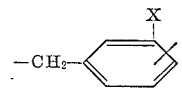

X being selected from the group consisting of halogen, hydroxy, lower alkoxy, lower alkylamino and dilower alkylamino radicals; radicals of the formula —CH$_2$Y, Y being selected from the group consisting of 5- or 6-membered heterocyclic ring residues containing 1–2 oxygen, sulfur, or nitrogen atoms; and radicals of the formula $-(CHR^2)_nZ$, $R^2$ being a hydrogen atom or methyl radical, $n$ being an integer of 1–2, and Z being a member of the group consisting of hydroxy, cyano, carboxyl radicals, salts thereof and their ester residues, and not more than two or A, B, D, and E being hydrogen at the same time.

The above-defined Formula I covers many compounds, all of which can be used as excellent antiozonants so long as they possess basic xylylenediamine structure. Some of the typical specific examples will be given in the later-appearing working examples.

Among the compounds of Formula I, derivatives of m- or p-xylylenediamine, particularly para-derivatives, are preferred. Also mixtures of meta- and para-derivatives can be used with equal preference with the para-derivatives. Furthermore, it is found that the compounds in which at least one of the substituents, A, B, D and E, is benzyl or substituted benzyl exhibit most excellent antiozonant effect.

The compounds of Formula I can be readily prepared by conventional chemical means of synthesis. For example, they can be synthesized by the dehydrohalogenation of halogenated alkyl with xylylenediamine, reduction of Schiff bases obtained by the dehydration condensation of a carbonyl compound with xylylenediamine, or by the addition of an unsaturated compound containing a polar radical such as acrylonitrile with xylylenediamine.

The compounds of the invention are broadly applicable as antiozonants for natural and various synthetic rubbers, for example, butadiene rubber, styrene-butadiene rubber, nitrile-butadiene rubber, isoprene rubber, isobutylene-isoprene rubber, chloroprene rubber, and other rubbery polymers. Since they never cause discoloration nor possess staining property, they can be very advantageously applied to white or light-colored rubber articles.

The blend ratio of the compound to rubber normally ranges from 0.1–5%, preferably 0.5–3%, based on the weight of the rubber component. Upon blending in such an amount, a rubber composition having an excellent antiozonant effect is obtained. The compounds can be blended as they are during the vulcanization of the rubber. Blending of the compounds has no detrimental effect on other additives to rubber, such as sulfur as a vulcanizing agent, vulcanizing accelerators such as dibenzothiazyl disulfide, vulcanizing activators such as zinc flowers and stearic acid, and fillers such as calcium carbonate, titanium oxide, and silica.

Hereinafter the invention will be explained with reference to typical working examples.

EXAMPLE

Various xylylenediamine derivatives within the scope of this invention were blended with natural and synthetic rubbers, to examine the compounds utility as antiozonants.

The sample employed was a white rubber composition prepared by milling the composition of the below-given recipe on a roll, and vulcanizing the same at 140° C. for 20 minutes. The rubber components employed were natural rubber, NR–RSS No. 1, and synthetic styrenebutadiene rubber, SBR No. 1502. The antiozonants employed are indicated in the later-given Table 1. Also as controls, samples were prepared by adding no antiozonant, or by adding conventional antiozonants such as N-phenyl-N'-isopropyl-p-phenylenediamine, N,N'-dibutylthiourea, and N,N'-di(2-naphthyl)-p-phenylenediamine. Such three compounds are typical of known antiozonants and have been widely used.

Recipe: Parts by weight
Rubber component _____ 100
Calcium carbonate _____ 100
Stearic acid _____ 1
Zinc flowers _____ 5
Sulfur _____ 2.5
Dibenzothiazyl disulfide _____ 1
Antiozonant _____ 2

The items tested, methods of testing, and test results were as follows:

(A) Crack occurrence test due to degradation caused by ozone

The sample (150 x 25 x 2 mm.) was held in an atmosphere of 50 parts per hundred million of ozone concentration at 38° C., under stretching to 20% elongation, and the time (number of hours) passed before cracks recognizable with human eyes through a magnifying lens were formed on the rubber surface, was measured. The measured results are shown also in Table 1.

(B) Discoloration and staining test

A layer of the sample in which an antiozonant was blended was pressed against a layer of sample containing no antiozonant, at 100° C. for 4 hours. The obtained multi-layered samples were further left outdoors for three days, and discoloration in antiozonant-containing rubber and the state of migration of the discoloration to the antiozonant-free rubber layer were observed. In order to facilitate the observation, the antiozonant-free rubber was prepared from a white rubber composition formed of the components listed in the above given recipe plus 20 weight parts of titanium oxide, with the antiozonant reduced to zero. The staining property was evaluated by the four classes as below, according to the degree of staining of the antiozonant-free rubber.

Class 0: No staining
Class 1: Slight staining
Class 2: Considerable staining
Class 3: Heavy staining As a result of the above tests, all of the rubber compositions containing the antiozonants of this invention and the one containing N,N'-dibutylthiourea did not show any discoloration under exposure to sunlight, and consequently the staining property was in all cases evaluated to be class zero. In clear contrast thereto, the samples containing N-phenyl-N'-isopropyl-p-phenylenediamine and N,N'-di(2-naphthyl)-p-phenylenediamine, which were the controls, both discolored to yellowish brown after approximately 20 hours, and the staining property evaluation was class 3 for the former, and class 2 for the latter.

The table given hereinbefore gives the specific antiozonant employed in each run, and the measured results of crack occurrence test, in which the m, p-xylylenediamine derivative means a mixture of meta and para derivatives at a ratio of 7:3.

TABLE 1

| | Antiozonant used | Time passed before cracks were formed (hr.) | |
|---|---|---|---|
| | | NR–RSS No. 1 | SBR No. 1502 |
| Control: | | | |
| a | None | 3 | 1 |
| b | N-phenyl-N'-isopropyl-p-phenylenediamine | 8 | 7.5 |
| c | N,N'-dibutylthiourea | 6 | 4 |
| d | N,N'-di(2-naphthyl)-p-phenylenediamine | 5 | 3 |
| Sample No.: | | | |
| 1 | N-benzyl-N'-ethyl-p-xylylenediamine | 24 | 20 |
| 2 | N-benzyl-N'-cyclohexyl-m,p-xylylenediamine | 21 | 21 |
| 3 | N-benzyl-N'-phenyl-p-xylylenediamine | 25 | 26 |
| 4 | N-benzyl-N'-isopropyl-2,5-dimethyl-p-xylylenediamine | 20 | 20 |
| 5 | N,N'-dibenzyl-m-xylylenediamine | 24 | 26 |
| 6 | N,N'-dibenzyl-m,p-xylylenediamine | 30 | 29 |
| 7 | N,N'-dibenzyl-2,5-dimethyl-1,4-xylylenediamine | 28 | 28 |
| 8 | N,N'-bis(4-ethylbenzyl)-m-xylylenediamine | 20 | 23 |
| 9 | N,N'-bis(4-t-butylbenzyl)-p-xylylenediamine | 31 | 32 |
| 10 | N,N'-diisopropyl-m-xylylenediamine | 11 | 10 |
| 11 | N-isobutyl-N'-cyclohexyl-m,p-xylylenediamine | 12 | 10 |
| 12 | N,N'-dicyclohexyl-m-xylylenediamine | 13 | 13 |
| 13 | N-isopropyl-N'-phenyl-m,p-xylylenediamine | 15 | 15 |
| 14 | N,N'-diphenyl-p-xylylenediamine | 15 | 14 |
| 15 | N-isopropyl-N'-(p-methoxyphenyl)-p-xylylenediamine | 15 | 15 |
| 16 | N-isopropyl-N'-phenyl-2,5-dimethyl-1,4-xylylenediamine | 13 | 12 |
| 17 | N,N'-di(1-naphthyl)-p-xylylenediamine | 27 | 23 |
| 18 | N,N'-di(2-naphthyl)-p-xylylenediamine | 26 | 23 |
| 19 | N,N'-di(1-naphthylmethyl)-p-xylylenediamine | 30 | 25 |
| 20 | N,N'-diphenethyl-p-xylylenediamine | 22 | 19 |
| 21 | N-m-methylbenzyl-N'-isopropyl-m,p-xylylenediamine | 21 | 22 |
| 22 | N,N'-bis(2-naphthylmethyl)-p-xylylenediamine | 29 | 25 |

TABLE I—Continued

| Antiozonant used | Time passed before cracks were formed (hr.) | |
|---|---|---|
| | NR-RSS No. 1 | SBR No. 1502 |
| 23. N,N'-dimethyl-N-benzyl-p-xylylenediamine | 21 | 22 |
| 24. N,N-dibenzyl-N'-isopropyl-m,p-xylylenediamine | 25 | 21 |
| 25. N,N,N'-tribenzyl-m-xylylenediamine | 30 | 26 |
| 26. N,N,N'-tribenzyl-2,5-dimethyl-p-xylylenediamine | 25 | 23 |
| 27. N-phenyl-N-methyl-N'-benzyl-xylylenediamine | 23 | 23 |
| 28. N,N'-dicyclohexyl-N-phenyl-m,p-xylylenediamine | 15 | 15 |
| 29. N-lauryl-N,N'-dimethyl-p-xylylenediamine | 13 | 12 |
| 30. N,N'-bis(p-chlorobenzyl)-p-xylylenediamine | 32 | 30 |
| 31. N,N'-bis(p-methoxybenzyl)-m,p-xylylenediamine | 23 | 23 |
| 32. N,N'-bis(p-methylaminobenzyl)-m-xylylenediamine | 26 | 25 |
| 33. N-p-chlorobenzyl-N'-isopropyl-p-xylylenediamine | 29 | 26 |
| 34. N-p-oxybenzyl-N'-ethyl-m,p-xylylenediamine | 28 | 25 |
| 35. N-p-oxybenzyl-N'-benzyl-p-xylylenediamine | 30 | 28 |
| 36. N,N,N'-tris(p-chlorobenzyl)-m,p-xylylenediamine | 32 | 30 |
| 37. N,N'-bis(p-oxybenzyl)-N-benzyl-p-xylylenediamine | 30 | 29 |
| 38. N,N,N',N'-tetramethyl-m-xylylenediamine | 15 | 13 |
| 39. N,N'-dimethyl-N,N'-dibenzyl-m,p-xylylenediamine | 20 | 21 |
| 40. N,N'-dimethyl-N,N'-diisopropyl-p-xylylenediamine | 19 | 20 |
| 41. N,N'-dimethyl-N,N'-dicyclohexyl-m,p-xylylenediamine | 16 | 18 |
| 42. N,N,N',N'-tetrabenzyl-m-xylylenediamine | 25 | 27 |
| 43. N,N,N',N'-tetrabenzyl-2,5-dimethyl-1,4-xylylenediamine | 25 | 26 |
| 44. N,N,N',N'-tetrakis(p-chlorobenzyl)-m,p-xylylenediamine | 25 | 23 |
| 45. N,N'-bis(p-chlorobenzyl)-N,N'-dibenzyl-m,p-xylylenediamine | 21 | 19 |
| 46. N,N,N'-tris(m-dimethylamino)-N'-benzyl-p-xylylenediamine | 25 | 23 |
| 47. N,N'-bis(2-furylmethyl)-p-xylylenediamine | 21 | 20 |
| 48. N,N'-bis(2-thienylmethyl)-m,p-xylylenediamine | 19 | 19 |
| 49. N,N'-bis(2-pyridylmethyl)-m,p-xylylenediamine | 24 | 22 |
| 50. N,N'-bis(2-furylmethyl)-N,N'-bis(β-oxyethyl)-m,p-xylylenediamine | 21 | 20 |
| 51. N,N'-bis(β-cyanoethyl)-2,5-dimethyl-p-xylylenediamine | 21 | 20 |
| 52. N,N'-bis(ethoxycarbonylmethyl)-m,p-xylylenediamine | 21 | 17 |
| 53. N,N'-bis(ethoxycarbonylethyl)-m-xylylenediamine | 23 | 22 |
| 54. N,N,N',N'-tetrakis(β-cyanoethyl)-m,p-xylylenediamine | 27 | 26 |
| 55. N,N,N',N'-tetrakis(butoxycarbonylmethyl)-p-xylylenediamine | 18 | 18 |
| 56. N,N,N',N'-tetrakis(ethoxycarbonylethyl)-m,p-xylylenediamine | 19 | 17 |
| 57. p-Xylylenediamine-tetraacetic acid | 23 | 21 |
| 58. N,N'-bis(β-oxyethyl)-N,N'-dibenzyl-p-xylylenediamine | 30 | 26 |

We claim:

1. A composition comprising a sulfurvulcanizable natural or synthetic diene rubbery polymer and from 0.1 to 5 parts per 100 parts of said rubbery polymer, by weight, of an antiozonant of the general formula

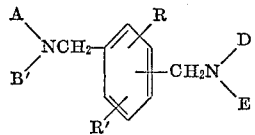

in which R and R' are each a member of the group consisting of a hydrogen atom and alkyl radicals of 1–4 carbon atoms, and A, B, D, and E are each a member of the group consisting of a hydrogen atom; alkyl, cycloalkyl, aryl, and aralkyl radicals of up to 20 carbons; radicals of the formula

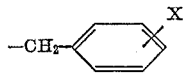

X being selected from the group consisting of halogen, hydroxy, lower alkoxy, lower alkylamino and di-lower alkylamino radicals; radicals of the formula —$CH_2Y$, Y being selected from the group consisting of 5- or 6-membered heterocyclic ring residues containing 1–2 oxygen, sulfur or nitrogen atoms; and radicals of the formula —$(CHR^2)_nZ$, $R^2$ being selected from the group consisting of a hydrogen atom and methyl radical, $n$ being an integer of 1–2, and Z being selected from the group consisting of hydroxy, cyano, and carboxyl radicals, salts thereof and ester residues thereof, with the proviso that not more than two of A, B, D, and E are hydrogen atoms.

2. The composition of claim 1, in which the antiozonant is N,N'-dibenzyl-m, and p-xylylenediamine.

3. The composition of claim 1, in which the antiozonant is N,N'-bis(4-t-butylbenzyl)-p-xylylenediamine.

4. The composition of claim 1, in which the antiozonant is N,N'-di(1-naphthylmethyl)-p-xylylenediamine.

5. The composition of claim 1, in which the antiozonant is N,N'-bis(p-chlorobenzyl)-p-xylylenediamine.

6. The composition of claim 1, in which the antiozonant is N,N,N'-tribenzyl-m, and p-xylylenediamine.

7. The composition of claim 1, in which the antiozonant is N,N,N',N'-tetrakis(p-chlorobenzyl)-m, and p-xylylenediamine.

References Cited

UNITED STATES PATENTS

| 3,317,918 | 5/1967 | Foster | 260—83.7 |
| 3,436,370 | 4/1969 | Blumel | 260—45.9 |

DONALD E. CZAJA, Primary Examiner

E. C. RZUCIDLO, Assistant Examiner

U.S. Cl. X.R.

260—45.8 R, 45.8 A, 45.8 N, 809